US008936423B2

(12) United States Patent
Davis et al.

(10) Patent No.: US 8,936,423 B2
(45) Date of Patent: Jan. 20, 2015

(54) PLASTIC POLYMER COVERED FASTENER (75) Inventors: David J. Davis, Rochester, MI (US); Larry J. Wilson, Commerce Township, MI (US); Steve J. Tomaszewski, Lake Zurich, IL (US)

(73) Assignee: MacLean-Fogg Company, Mundelein, IL (US)

( * ) Notice: Subject to any disclaimer, the term of this patent is extended or adjusted under 35 U.S.C. 154(b) by 103 days.

(21) Appl. No.: 13/547,267

(22) Filed: Jul. 12, 2012

(65) Prior Publication Data

US 2013/0149071 A1 Jun. 13, 2013

Related U.S. Application Data (60) Provisional application No. 61/524,921, filed on Aug. 18, 2011.

(51) Int. Cl.
*F16B 37/14* (2006.01)
*F16B 23/00* (2006.01)
*F16B 33/00* (2006.01)
*F16B 1/00* (2006.01)

(52) U.S. Cl.
CPC ............. *F16B 23/00* (2013.01); *F16B 33/00* (2013.01); *F16B 1/0071* (2013.01); *F16B 37/14* (2013.01)
USPC .......................................... 411/419; 411/377

(58) Field of Classification Search
CPC ....... F16B 37/14; F16B 23/0061; B60B 7/17; B60B 7/00
USPC ................................................. 411/377, 429
See application file for complete search history.

(56) References Cited

U.S. PATENT DOCUMENTS

| 1,632,991 | A | * | 6/1927 | Booth | 411/429 |
|---|---|---|---|---|---|
| 3,585,900 | A | * | 6/1971 | Chaivre | 411/430 |
| 3,897,712 | A | | 8/1975 | Black | |
| 4,041,834 | A | | 8/1977 | Herkes et al. | |
| 4,452,556 | A | | 6/1984 | Nelson et al. | |
| 4,557,654 | A | | 12/1985 | Masuda | |
| 4,764,070 | A | * | 8/1988 | Baltzell et al. | 411/430 |
| 4,815,920 | A | * | 3/1989 | Morooka | 411/431 |
| 4,887,950 | A | | 12/1989 | Sakayori | |
| 4,993,902 | A | | 2/1991 | Hellon | |
| 5,174,704 | A | * | 12/1992 | Kazino et al. | 411/403 |
| 5,324,149 | A | | 6/1994 | Bainbridge et al. | |
| 5,350,266 | A | | 9/1994 | Espey et al. | |
| 5,553,984 | A | | 9/1996 | Smith | |
| 5,752,794 | A | | 5/1998 | Krawczak | |
| 5,772,377 | A | | 6/1998 | Bydalek | |
| 5,857,818 | A | | 1/1999 | Bias, Sr. | |
| 5,980,178 | A | * | 11/1999 | Ono | 411/373 |
| 6,238,158 | B1 | | 5/2001 | Clements | |
| 6,318,942 | B1 | | 11/2001 | Wieczorek | |

(Continued)

FOREIGN PATENT DOCUMENTS

KR    20040110013 A    12/2004

OTHER PUBLICATIONS

Search Report for related application No. PCT/US2012/046709 filed Jul. 13, 2012; Mailed Oct. 4, 2012.

*Primary Examiner* — Flemming Saether
(74) *Attorney, Agent, or Firm* — Brinks Gilson & Lione (57) ABSTRACT Fasteners are provided with a polymer layer covering a body. The polymer layer may improve the aesthetics of the fastener and may be colored to provide various color options. The polymer layer covers at least part of a wrench bearing surface.

23 Claims, 6 Drawing Sheets

(56) References Cited

U.S. PATENT DOCUMENTS

| | | |
|---|---|---|
| 6,599,071 B1 | 7/2003 | McCauley et al. |
| 6,739,813 B1 | 5/2004 | Gundy et al. |
| 6,860,692 B2 | 3/2005 | Van Ingen et al. |
| 6,866,457 B2 | 3/2005 | Wilson |
| 7,250,003 B2 * | 7/2007 | Thompson ............ 470/18 |
| 7,427,181 B2 | 9/2008 | Denton et al. |
| D606,853 S | 12/2009 | Shapiro et al. |
| 7,896,599 B2 | 3/2011 | Stephen et al. |
| 2008/0166203 A1 * | 7/2008 | Reynolds et al. ............ 411/377 |
| 2011/0116892 A1 | 5/2011 | Wilson |

* cited by examiner

PLASTIC POLYMER COVERED FASTENER

This application claims priority to U.S. Provisional Application No. 61/524,921, filed Aug. 18, 2011, which is hereby incorporated by reference herein.

BACKGROUND

The present invention relates generally to fasteners and more particularly to a fastener with a plastic polymer layer covering at least a portion of a bearing surface.

Fasteners are used in numerous applications to attach various components together. Typically, a fastener has at least a threaded portion and one or more bearing surfaces attached thereto. The bearing surfaces are designed to receive torque from a tool, such as a socket or other wrench, which is used to tighten or loosen the fastener. In a conventional fastener, such as a nut, the fastener may have internal threads and six bearing surfaces oriented in a hexagonal shape around the internal threads. However, other fasteners may have external threads, such as bolts and screws. Fasteners may also have a different number of bearing surfaces as desired.

Aesthetics is one concern for certain fasteners, such as automobile wheel nuts. In particular, many automotive consumers are drawn to the aesthetics of an automobile's wheels, since this is often a distinctive part of an automobile. As a result, the wheel nuts become an integral component of the aesthetics of the wheel, and the automobile more generally, because the wheel nuts form a highly visible pattern around the center of the wheel.

One approach that has been highly successful in addressing wheel nut aesthetics is stainless steel capped wheel nuts. In this solution, a nut insert is capped with a stainless steel covering. Since stainless steel is resistant to corrosion, highly durable and visually attractive, stainless steel capped wheel nuts have been capable of addressing a large portion of the demand for aesthetically pleasing wheel nuts. Another advantage of stainless steel capped wheel nuts is that the color of stainless steel, a shiny silverish color, generally matches the color used for most automobile wheels.

A broader design trend in consumer aesthetics is to offer a variety of different color schemes that a consumer can choose from according to the consumer's individual aesthetic interests. However, manufacturing fasteners with different color schemes has been difficult. In particular, the surfaces of a fastener's bearing surfaces must be highly durable to withstand the wrenching forces that are applied to the fastener during tightening and loosening. This is particularly a concern with the automotive wheel nuts because automotive wheel nuts are a critical safety feature of an automobile and automobile wheel nuts are commonly subjected to especially high tightening and loosening torques.

Conventional colored coatings have generally been unsatisfactory for automotive wheel nuts. For example, some metal adhering coatings, such as paint, plating, chemical treatments and the like, are available, but most of these lack sufficient durability or are unattractive aesthetically. In particular, while paint and other coatings are often available in a wide variety of colors, many of these coatings crack when high wrenching forces are applied to the coating. As a result, the body of the fastener becomes exposed to the environment through the cracked coating. This will eventually lead to visible corrosion of the body and diminish the aesthetics of the automobile. On the other hand, coatings that have been found to being more durable are not available in attractive color choices, and are mostly useful for preventing corrosion on less conspicuous parts.

Another alternative that has been used is caps that are snapped or screwed onto a fastener after the fastener has been tightened. This design has become disfavored, however, and is not widely used because the plastic caps tend to fall off the fastener over time and become lost. This design is also less convenient because the cap is a separate piece that must be assembled onto the fastener after the fastener is tightened and must be removed from the fastener in order to loosen the fastener.

Accordingly, the inventors believe that it would be desirable to provide an improved fastener that is aesthetically attractive to consumers.

SUMMARY

Improved fasteners are described with a plastic polymer layer, referred to herein generally as a polymer, that covers at least a part of a metallic body. The body has bearing surfaces that are adapted to receive torque from a wrench. The bearing surfaces may each have a recessed portion and edge surfaces. The polymer layer may cover the recessed portion and the edge surfaces so that the wrench engages the outer surface of the polymer layer. The inventions herein may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Referring now to the figures, and particularly to FIGS. 1A-1D, an automotive wheel nut 10 is shown. Although the described embodiments relate to an automotive wheel nut 10, the inventions may also be used on other fasteners as well. The nut 10 includes a metallic nut body 12 with internal threads 14 that are threadable onto the external threads of a mating fastener. Preferably, an axial opening 16 extends through the entire length of the nut body 12, although the top portion of the opening 16 may not be threaded. The nut body 12 also includes bearing surfaces 18 that receive wrenching forces during tightening and loosening of the nut 10 and transfers the torque to the threaded portion 14. As shown, the nut body 12 may have six bearing surfaces 18 arranged in a conventional hexagonal shape around the axial opening 16 and the internal threads 14. Preferably, the nut body 12 has a flange 20 below the bearing surfaces 18 that extends outward from the bearing surfaces 18 and has an inward extending step 22 below the flange 20.

A polymer layer 24 is also permanently attached to the nut body 12 by covering at least a portion of the nut body 12. As shown in FIG. 1C, the polymer layer 24 covers the full length of the bearing surfaces 18 and wraps around the flange 20 and covers the inward extending step 22. The polymer layer 24 covering the inward step 22 is desirable to longitudinally restrain the polymer layer 24 on the nut body 12 and prevent the polymer layer 24 from sliding off the top of the nut body 12. The top of the axial opening 16 may also be enclosed by a cap 26, which may also be fully covered by the polymer layer 24. The cap 26 may be a metal or polymer cap 26. Thus, the polymer layer 24 may retain the cap 26 on the nut body 12 by entrapping the cap 26. Preferably, the polymer layer 24 is molded onto the nut body 12 and cap 26 in an overmolding process after the nut body 12 has been formed and the cap 26 has been assembled onto the nut body 12. Preferably, the polymer layer 24 is made from nylon 6-6 with 14% glass fiber reinforcement and a UV stabilizer. However, any polymer with a high melting temperature that is suitable in an automotive wheel environment and is suitable for molding may be used.

Figure 1A:
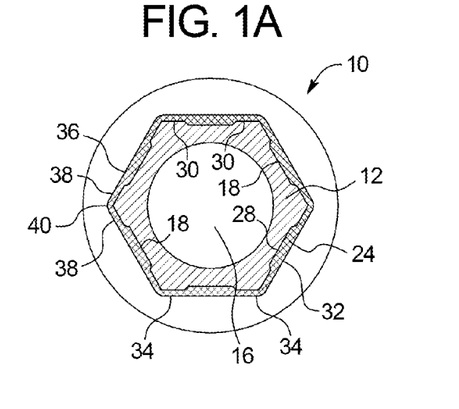
FIG. 1A is a top cross-sectional view of a nut along sectional line 1A-1A in FIG. 1B.
Figure 1B:
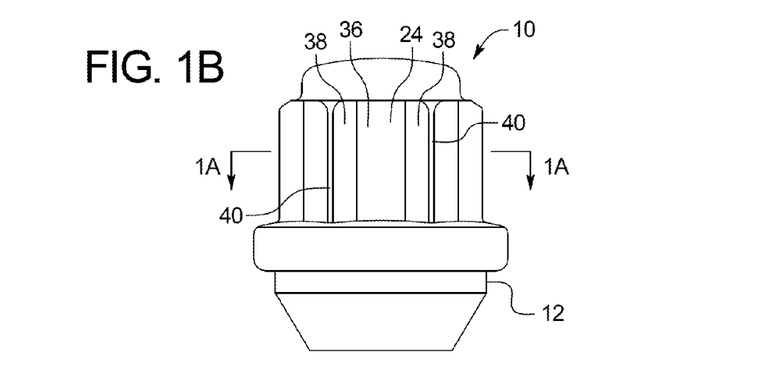
FIG. 1B is a side view of the nut.
Figure 1C:
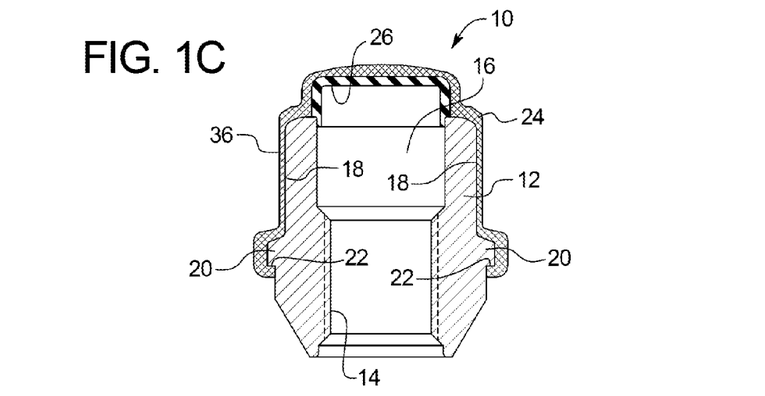
FIG. 1C is a side cross-section view of the nut.

As shown in FIG. 1A, the bearing surfaces 18 each have a recessed portion 28 between opposing edge surfaces 30. The polymer layer 24, however, preferably does not have a corresponding recessed portion so that the polymer layer 24 has a thicker first portion 32 filling the recessed portion 28 and thinner second portions 34 covering the edge surfaces 30. This is desirable to rotationally retain the polymer layer 24 on the nut body 12 and prevent the polymer layer 24 from sliding around the nut body 12 during wrenching loads. The thicker first portions 32 of the polymer layer 24 also aids in the molding process by providing flow channels for melted polymer material to spread around the nut body 12. Preferably, the thickness of the polymer layer 24 is generally uniform along the edge surfaces 30 of the bearing surfaces 18. In one alternative, the outer surface 36 of the polymer layer 24 is generally straight along each of the bearing surfaces 18 so that the shape of the outer surface 36 of the polymer layer 24 generally corresponds to a conventional hexagonal fastener. Thus, when the wheel nut 10 is tightened and loosened, the wrench engages the outer surface 36 of the polymer layer 24 and the wrench force is transmitted through the polymer layer 24 to the bearing surfaces 18 of the nut body 12.

Figure 1D:
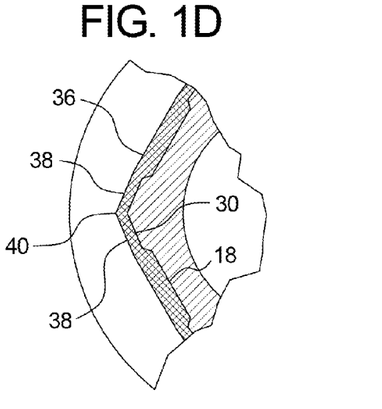
FIG. 1D is an enlarged view of a portion of FIG. 1A.

Alternatively, as shown in FIG. 1D, at least a portion 38 of the edge surfaces 30 of the nut body 12 are contoured inward at the ends away from an imaginary plane defined by each corresponding bearing surface 18. One embodiment of this design is described in U.S. Patent Publication No. 2011/0116892, which is incorporated herein by reference in its entirety. Preferably, the contoured edge surface portion 38 is flat and is angled about 3.degree. to about 5.degree. from the imaginary plane of the bearing surface 18. The polymer layer 24 may have a uniform thickness along the contoured portion 38 so that the outer surface 36 of the polymer layer 24 is correspondingly contoured at the contoured edge portions 38. The contoured ends may be desirable to minimize damage to the polymer layer 24 caused by wrenching forces during tightening and loosening. In particular, the contoured ends distribute the wrenching forces away from the points 40 between adjacent bearing surfaces 18, thereby reducing the maximum wrenching pressures experienced by the bearing surfaces 18 and the outer surface 36 of the polymer layer 24. This may be particularly desirable in the polymer covered fastener described herein because polymers are inherently softer than metal and more likely to be damaged by the high wrenching forces used on automotive wheel nuts 10.

While the polymer layer may be considered to be a bearing surface (or a part of the bearing surface as in the embodiments described below) in the sense that a wrench engaging the nut will contact the polymer layer, the bearing surfaces described herein generally refer to the side surfaces of the threaded metallic body, since the metallic body is the primary structural component that transfers torque from the wrench to the threads. Thus, in the preferred embodiments, the nut or bolt body has six bearing surfaces arranged in a conventional hexagonal pattern. Each of the six bearing surfaces is defined by two edge surfaces that oppose each other (that is, are on opposite sides of a single bearing surface). A recessed portion, which may be considered to be part of the bearing surface of the body, is located between each pair of opposing edge surfaces. However, it is possible that some of the bearing surfaces of the metallic body may not have the recesses and may have conventional flat sided bearing surfaces (or including the inwardly contoured portions). Thus, the polymer layer would not fill a recess on bearing surfaces without recesses, and in the embodiments below, there would be no polymer layer along bearing surfaces without recesses so that the bearing surfaces without recesses would be fully exposed. As an example, half of the six bearing surfaces may have recesses and the other half of the bearing surfaces may not have recesses. In this arrangement, the bearing surfaces with recesses are preferably symmetrically interposed between the bearing surfaces without recesses. Similarly, only two bearing surfaces on opposite sides of the nut body may have recesses filled with the polymer layer.

Figure 2A:
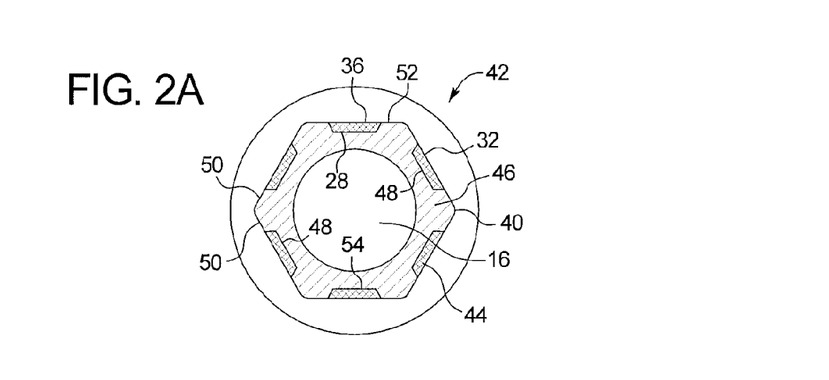
FIG. 2A is a top cross-sectional view of another nut along sectional line 2A-2A in FIG. 2B.
Figure 2B:
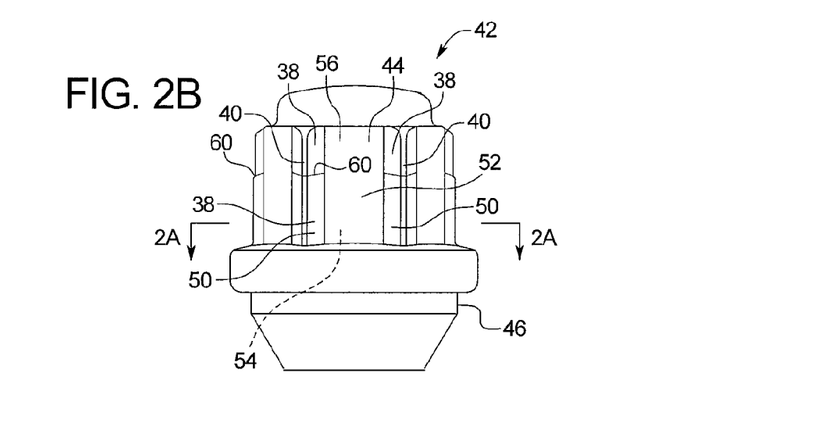
FIG. 2B is a side view of the nut.
Figure 2C:
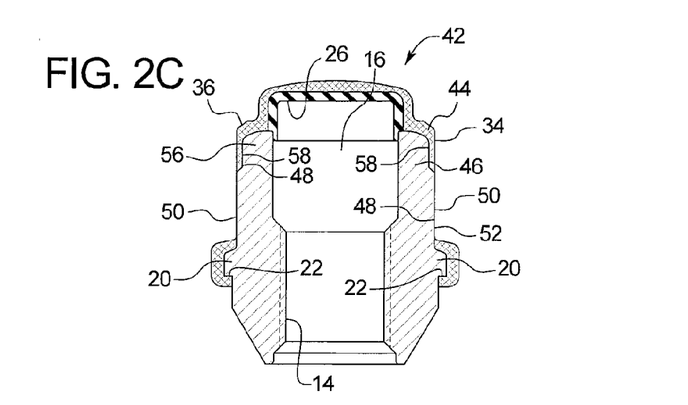
FIG. 2C is a side cross-section view of the nut.

Turning to FIGS. 2A-2C, another wheel nut 42 is shown. Like the wheel nut 10 of FIGS. 1A-1C, the wheel nut 42 has a polymer layer 44 covering a nut body 46. However, in this embodiment, the polymer layer 44 does not fully cover the entire length of the bearing surfaces 48. Instead, the edge surfaces 50 of the bottom portion 52 are exposed and not covered by the polymer layer 44. Preferably, the recessed portion 28 extends along the entire length of the bearing surface 48 so that the polymer layer 44 extends along a middle portion 54 of the bottom portion 52 of the bearing surface 48 within the recessed portion 28. The covered middle portion 54 and the exposed edge surfaces 50 are shown in FIG. 2A, and the exposed edge surfaces 50 are also shown in FIG. 2C (the cross-sectional view of FIG. 2C cuts through the points 40 of the bearing surfaces 48, and thus, does not show the covered middle portion 54). The polymer layer 44 covering the middle portion 54 of the bearing surface 48 preferably connects the polymer layer 44 covering the top portion 56 of the nut body 46 to the polymer layer 44 covering the flange 20.

The edge surfaces 50 of the bottom portion 52 may extend outward relative to the covered edge surfaces 58 of the top portion 56. As a result, the outer surface 36 of the polymer layer 44 covering the edge surfaces 58 of the top portion 56 may be generally contiguous with the exposed edge surfaces 58 of the bottom portion 52. This makes the transition 60 between the covered edge surfaces 58 and the exposed edge surfaces 50 generally smooth. The generally smooth transition 60, however, may have a slight step 60 between the covered and exposed edge surfaces 58, 50. This is shown, for example, in FIG. 2B. The slight step 60 may be due to manufacturing tolerances and/or shrinkage of the polymer after the molding process. In addition, it may be desirable for the exposed edge surfaces 50 to be slightly stepped 60 up relative to the outer surface 36 of the covered edge surfaces 58 so that a wrench engages the exposed edge surfaces 50 before engaging the covered edge surfaces 58 as described in more detail below. For example, it is preferable for the exposed edge surfaces 50 to extend at least 0.005" outward from the outer surface 36 of the covered edge surfaces 58.

One advantage of the wheel nut 42 of FIGS. 2A-2C is that the metal bearing surfaces 48 at the edge surfaces 50 of the bottom portion 52 directly engage the wrench during tightening and loosening. As a result, the polymer layer 44 does not need to absorb all of the wrenching force. This may improve the durability of the wheel nut 42 despite the lower durability of the polymer layer 44. The inwardly contoured edge portions 38 described above may also be used with this embodiment to further improve durability. In addition, the exposed edge surfaces 50 of the bottom portion 52 may be covered with a coating that adheres to the metal surface of the nut body 46. While metal adhering coatings are generally disfavored for automotive wheel nuts because of appearance and corrosion concerns, it may be acceptable in this particular embodiment because the exposed edge surfaces 50 constitute a relatively small area of the wheel nut 42. In other words, most of the wheel nut 42 remains covered by the polymer layer 44. Additionally, the exposed edge surfaces 50 will typically be installed relatively deep into the wheel of a vehicle and may be considerably less visible than the top portion 56 of the bearing surfaces 48.

Because the polymer layer 44 is significantly less durable than the nut body 46, it is particularly desirable to minimize engagement between the wrench and the polymer layer 44 during tightening and loosening. One problem that can cause the wrench to contact the polymer layer 44 is misalignment between the wrench and the wheel nut 42. Typically, socket wrenches are used to tighten and loosen wheel nuts 42. However, when the axis of the socket wrench is angled, or misaligned, from the axis of the wheel nut 42, the socket wrench will begin to contact the outer polymer surface 36 of the top portion 56. In other words, if the socket wrench and wheel nut 42 are perfectly aligned with each other and the outer polymer surface 36 of the top portion 56 is stepped down as described above, there will be no contact between the socket wrench and the outer polymer surface 36 of the top portion 56, since the exposed edge surfaces 50 will be the only torsional contact between the socket wrench and the wheel nut 42. However, socket wrenches and wheel nuts are typically designed to have reasonable clearances between the wrench and the nut 42 to allow the socket to easily slide on and off the nut. As a result, the socket wrench may be installed on the wheel nut 42 at an angle, at least as much as the clearance between the socket and the nut 42 allows. Thus, the more a socket wrench is misaligned on the nut 42, the more the socket will contact and transmit force to the outer polymer surface 36 of the top portion 56. Because the polymer layer 44 is less durable than the nut body 46, this can cause the polymer layer 44 to become damaged.

In order to avoid damage to the outer polymer surface 36 of the top portion 56, it is desirable to minimize the length of the points 40 that is covered by the polymer layer 44, and maximize the length of the points 40 (the edge surfaces 50) that is exposed and uncovered by the polymer layer. For example, it may be preferable for the length of the covered points 40 of the top portion 56 to be about 0.23 times the nominal width across the hexagon flats or less. Preferably, the length of the covered points 40 is at least 1 mm. It may also be preferable for the length of the exposed edge surfaces 50 to be about 2.5 times the length of the covered points 40 or more. This relationship may be useful because a longer length for the exposed edge surfaces 50 is desirable to guide the socket wrench onto the wheel nut 42 and minimize misalignment between the socket and the nut 42. Also, a relatively short length for the covered points 40 is desirable to reduce the portion of the polymer layer 44 that may be contacted due to misalignment between the socket and nut 42.

Figure 3A:
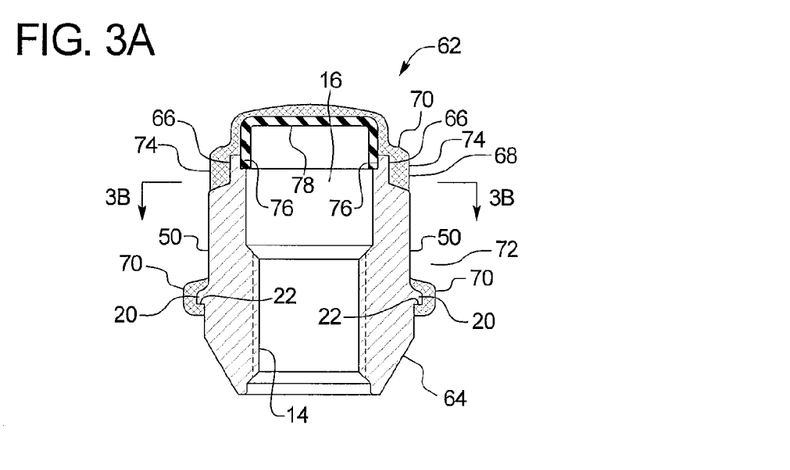
FIG. 3A is a side cross-sectional view of another nut.
Figure 3B:
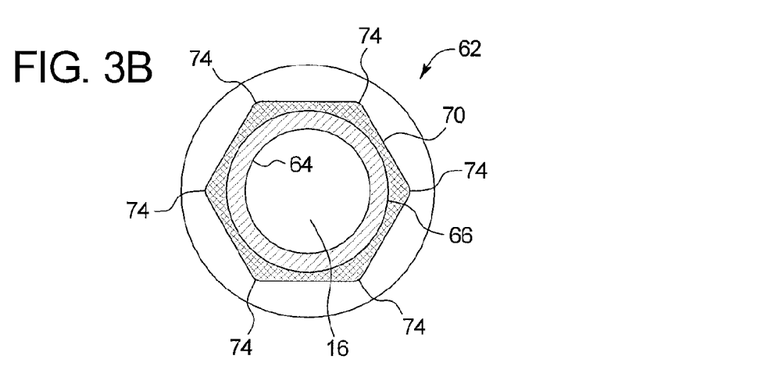
FIG. 3B is a top cross-sectional view of the nut along sectional line 3B-3B in FIG. 3A.

As shown in FIGS. 3A-3B, the wheel nut 62 may also have a nut body 64 with a round exterior surface 66 along the top portion 68. Like the wheel nut 42 shown in FIGS. 2A-2C, the polymer layer 70 fully covers the top portion 68 but does not cover the exposed edge surfaces 50 of the bottom portion 72. This design may increase the durability of the wheel nut 62 further since it may allow a small amount of twisting to be applied to the top polymer points 74 while minimizing damage to the polymer layer 70. In particular, because the polymer layer 70 along the top portion 68 engages a round surface 66 on the nut body 64 (in contrast to an out-of-round shape like a hexagon), the polymer layer 70 may rotate slightly around the round surface 66 of the nut body 64 without tearing the polymer layer 70. For example, this may occur if the socket wrench is misaligned on the exposed edge surfaces 50 of the nut body 64 or if the edge surfaces 50 become deformed after repeated tightening and loosening. In these cases, the socket wrench may contact the top polymer points 74 and slightly torque the polymer points 74 until solid engagement between the socket wrench and the exposed edge surfaces 50 is achieved. However, because the top polymer points 74 are mounted on the round surface 66 of the nut body 64, it is possible that the polymer points 74 will rotate on the round surface 66 of the nut body 64 without tearing the polymer layer 70 between the socket wrench and the nut body 64.

As shown in FIG. 3A, the nut body 64 may also be provided with a counterbore 76 at the top of the axial opening 16. The cap 78 may be made out of metal, like stainless steel, and may be sized for a press fit into the counterbore 76. As a result, the cap 78 may be easier to manufacture, and the cap 78 and nut body 64 may be securely assembled by press fitting the cap 78 and nut body 64 together. The bottom of the counterbore 76 also provides a solid stop surface for the bottom of the cap 78 to maintain a consistent top position of the cap 78.

Figure 4A:
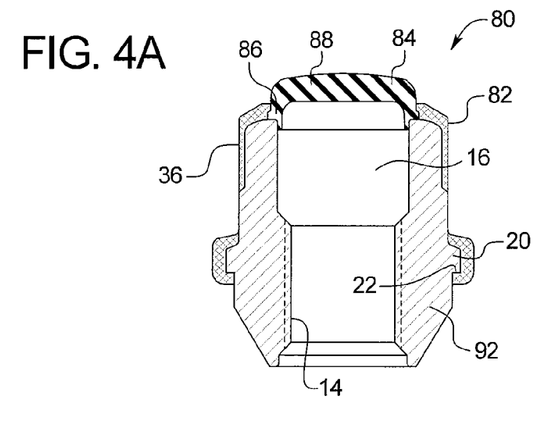
FIG. 4A is a side cross-sectional view of another nut.
Figure 4B:
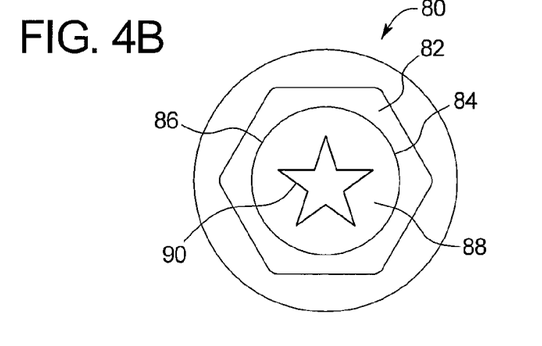
FIG. 4B is a top view of the nut.

Turning to FIGS. 4A-4B, a wheel nut 80 is shown where the polymer layer 82 does not fully cover the cap 84. Instead, the polymer layer 82 only covers the circular edge 86 of the cap 84. This may be useful to retain the cap 84 onto the nut body 92 while leaving the center portion 88 of the cap 84 exposed. As shown in FIG. 4B, this may be desirable so that a logo or design 90 can be formed on the top of the cap 84, which remains visible after the polymer layer 82 is molded onto the nut body 92 and the cap 84. If desired, the cap 84 may also be a molded polymer component with the logo or design 90 molded into the polymer 84. The polymer 84 may also be molded from a polymer with a matching color to the polymer layer 82 so that the polymer cap 84 and polymer layer 82 aesthetically blend together. Alternatively, the cap 84 may be metallic to suit customer preferences and provide for other ornamental options, such as laser engraving or conventional embossing and engraving.

Figure 5A:
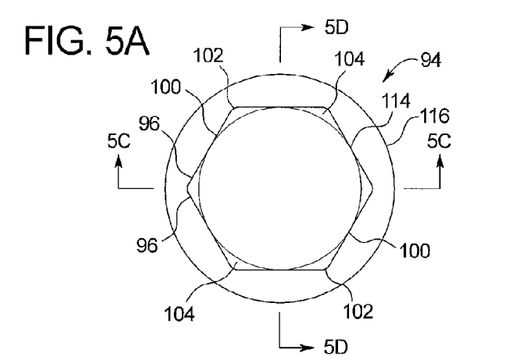
FIG. 5A is a top view of another nut.
Figure 5B:
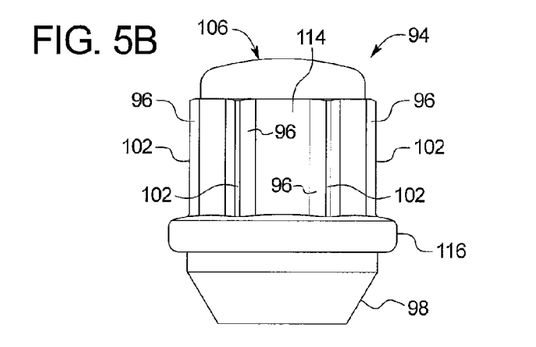
FIG. 5B is a side view of the nut.
Figure 5C:
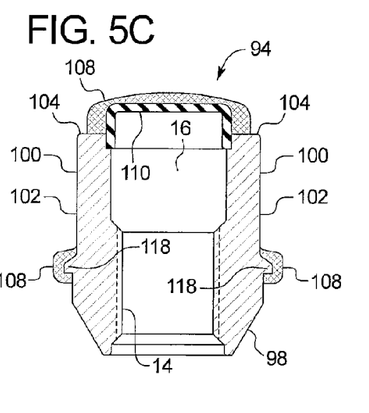
FIG. 5C is a side cross-section view of the nut along sectional line 5C-5C in FIG. 5A.
Figure 5D:
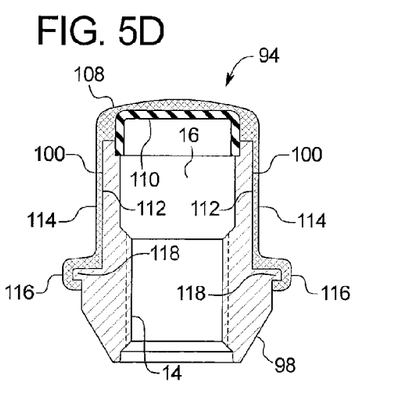
FIG. 5D is a side cross-section view of the nut along sectional line 5D-5D in FIG. 5A.

Turning to FIGS. 5A-5D, another wheel nut 94 is shown. The wheel nut 94 is similar to the wheel nut 42 of FIGS. 2A-2C, in that the edge surfaces 96 of the nut body 98 are exposed like the bottom portion 52 of the FIG. 2B wheel nut 42. However, unlike the FIG. 2B wheel nut 42, the exposed edge surfaces 96 extend along the entire length of the bearing surfaces 100. As shown in FIGS. 5A and 5C, a top portion 104 of the points 102 may also be exposed along the top side 106 of the nut body 98 or wheel nut 94. Thus, in this version, the polymer layer 108 does not form any portion of the bearing surface points 102. The polymer layer 108 may cover the remaining portion of the top side 106 of the wheel nut 94, including the cap 110, or may cover a circular edge of a cap like in FIG. 4A. Like the bottom portion 52 in FIGS. 2A-2B, the polymer layer 108 covers a recessed portion 112 of the nut body 98 along the middle portion 114. Below the bearing surfaces 100, the polymer layer 108 connects to a portion 116 that wraps around the flange 118 of the nut body 98.

One of the advantages of the wheel nut 94 of FIGS. 5A-5D is that the polymer layer 108 may be more durable since no portion of the points 102 is covered by the polymer layer 108. Because most of the torque from a wrench is applied at the points 108 and the adjacent edges 96 of the bearing surfaces 100, this is an area that is more likely to cause damage to the polymer layer 108. However, in this design, the polymer layer 108 only extends along the middle portions 114 of the bearing surfaces 100, which is an area that typically encounters a much lower wrenching load during tightening and loosening. The exposed edge surfaces 96 may also include the inwardly contoured portions described above to minimize deformation of the edge surfaces 96.

One of the advantages described above for the wheel nut 42 of FIGS. 2A-2C is that the bottom exposed edge surfaces 50 are less likely to be easily visible to a bystander, since the exposed edge surfaces 50 will be buried within the wheel. While this may not be as much of an advantage of the wheel nut 94 of FIGS. 5A-5D, since the edge surfaces 96 will be exposed along the top portion and may even be exposed along the top side 106, this may be designed in a manner that is aesthetically pleasing. For example, it may be desirable to use contrasting colors for the polymer layer 108 and the exposed edge surfaces 96 of the nut body 98. This color scheme may be more desirable than the matching color scheme described above in some situations, because the exposed portions 96, 104 of the nut body 98 could be visually emphasized and contrasted with the polymer layer 108. This may be desirable to some consumers who wish to be able to easily see the condition of the bearing surface points 102 and adjacent edge surfaces 96, since these are the critical regions for transferring wrenching torque to the wheel nut 94.

Figure 6:
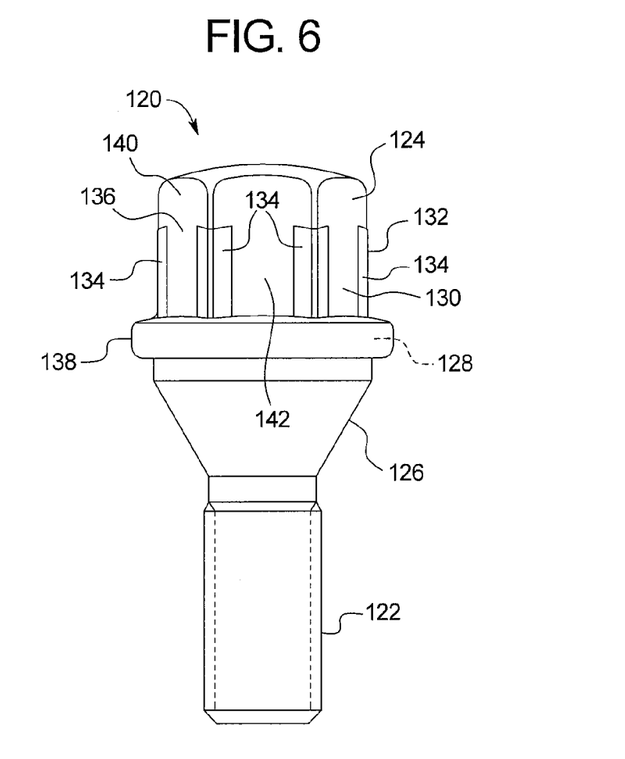
FIG. 6 is a side view of a bolt.

As shown in FIG. 6, an automotive wheel bolt 120 is shown. In contrast to the wheel nuts described above, the wheel bolt 120 has an externally threaded portion 122 and does not have an axial opening extending therethrough. However, aspects described above related to the polymer layer 124 covering a portion of the body of a fastener may also be applied to the wheel bolt 120. For example, the bolt body 126 may have a flange 128 with a step like shown in FIG. 1C, which the polymer layer 124 wraps around. The bottom portion 130 of the bolt head 132 may also have exposed edge surfaces 134 like shown in FIGS. 2A-2C. The middle portion 136 of the bolt head 132 may also be recessed so that the polymer layer 124 covers the middle portion 136 of the bottom portion 130. Thus, like FIGS. 2A-4B, the polymer layer 124 has a flange portion 138, a top portion 140, and a center portion 142 between the exposed edge surfaces 134 that connects the flange portion 138 and the top portion 140 together. Like FIGS. 2A-3B, the top portion 140 of the polymer layer 124 fully covers the top side and the top circumferential portion of the bolt body 126.

As with the embodiments of FIGS. 1A-4B, the top portion 140 of the polymer layer 124 forms an exterior shape that generally corresponds in shape to the hexagonal shape of the fastener, although the top portion 140 may be stepped-down in size as described above to minimize damage to the polymer layer 124. Alternatively, the exposed edge surfaces 134 may extend along the entire length of the bearing surfaces like in FIGS. 5A-5D if desired. Like the embodiments above, the middle portion 136 of the polymer layer 124 also generally corresponds in shape to the hexagonal shape of the fastener, and particularly, is generally in alignment with the outer surface of the exposed edge surfaces 134.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A fastener with a threaded portion adapted to threadably engage a mating fastener and an out-of-round shape adapted to transfer torque from a wrench to said threaded portion, said fastener being a nut and comprising:
   a body made from metal and comprising said threaded portion, said body comprising a bearing surface comprising opposing edge surfaces, a recessed portion disposed between said edge surfaces, and an opening at a top of said body;
   a cap disposed over said opening to enclose said opening; and
   a plastic polymer layer covering at least said recessed portion of said bearing surface and not covering at least a portion of said edge surfaces, said plastic polymer layer fully covering said cap.

2. The fastener according to claim 1, wherein said plastic polymer layer covers at least an entire circumference of a top portion of said body and forms an exterior shape along said top portion that generally corresponds in shape to said out-of-round shape.

3. The fastener according to claim 1, wherein said plastic polymer layer along said top portion covers a portion of said body having a round exterior shape.

4. The fastener according to claim 1, wherein said edge surfaces along a bottom portion extend outward at least 0.005" from said plastic polymer layer along said top portion.

5. The fastener according to claim 1, wherein a length of said plastic polymer layer along said top portion forming said exterior shape generally corresponding to said out-of-round shape is at least about 1 mm and about 0.23 times a nominal width across hexagonal flats of said out-of-round shape or less.

6. The fastener according to claim 5, wherein a length of said edge surfaces is about 2.5 times said length of said plastic polymer layer along said top portion or more.

7. The fastener according to claim 1, wherein said exposed edge surfaces of a bottom portion are covered by a metal adhering coating.

8. The fastener according to claim 1, wherein each of said edge surfaces comprises at least a portion disposed at opposing ends of said bearing surface contoured inward from an imaginary plane defined by said bearing surface.

9. The fastener according to claim 8, wherein said portion is flat and extends along an angle about 3° to about 5° from said imaginary plane.

10. The fastener according to claim 1, further comprising a counterbore at said top of said body, said cap being pressed into said counterbore to enclose said opening.

11. The fastener according to claim 1, wherein said nut is an automotive wheel nut.

12. The fastener according to claim 1, wherein each of said edge surfaces comprises at least a portion disposed at opposing ends of said bearing surface contoured inward from an imaginary plane defined by said bearing surface.

13. The fastener according to claim 12, wherein said portion is flat and extends along an angle about 3° to about 5° from said imaginary plane.

14. The fastener according to claim 1, further comprising an inward extending step disposed below said bearing surfaces, said plastic polymer layer covering said step, wherein said plastic polymer layer is retained on said bearing surfaces by said step.

15. The fastener according to claim 1, wherein said fastener is an automotive wheel nut, further comprising an inward extending step disposed below said bearing surfaces, said plastic polymer layer covering said step, wherein said plastic polymer layer is retained on said bearing surfaces by said step.

16. The fastener according to claim 15, wherein said edge surfaces are not covered by said plastic polymer layer along an entire length of said out-of-round shape.

17. The fastener according to claim 16, further comprising a counterbore at said top of said body, said cap being pressed into said counterbore to enclose said opening.

18. The fastener according to claim 17, wherein said cap is made of metal.

19. The fastener according to claim 18, wherein each of said edge surfaces comprises at least a portion disposed at opposing ends of said bearing surface contoured inward from an imaginary plane defined by said bearing surface.

20. The fastener according to claim 1, wherein said edge surfaces are not covered by said plastic polymer layer along an entire length of said out-of-round shape.

21. The fastener according to claim 1, wherein said edge surfaces and said plastic polymer layer have contrasting colors.

22. The fastener according to claim 1, wherein said plastic polymer layer is made from nylon 6-6 with 14% glass fiber reinforcement and a UV stabilizer.

23. The fastener according to claim 1, wherein said cap is made of metal.

* * * * *